Figure 1:
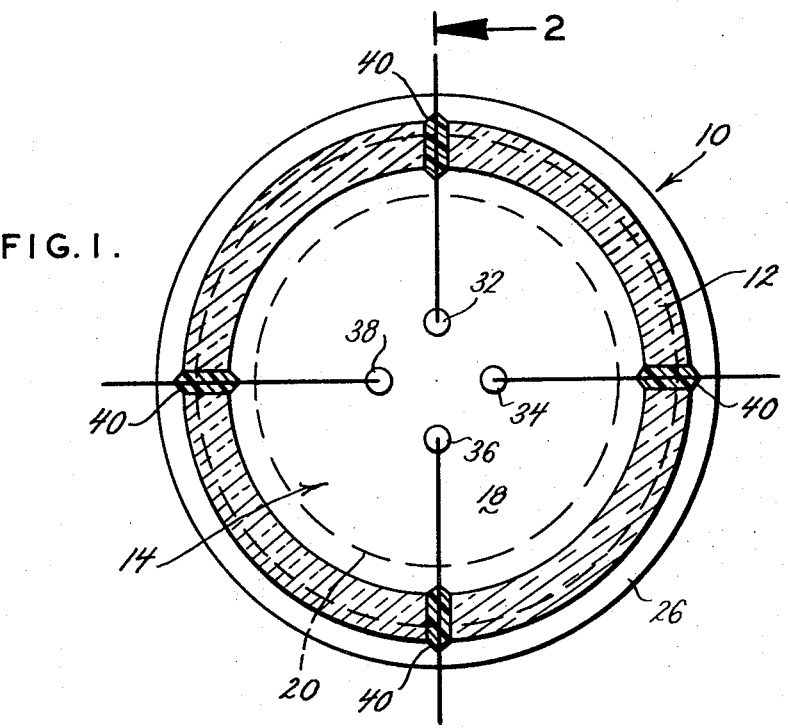

United States Patent

Dueker

[15] 3,693,013
[45] Sept. 19, 1972

[54] VIDEO TRACKING, LATERAL PHOTOEFFECT SEEKING ELECTRO-OPTIC DETECTOR

[72] Inventor: James E. Dueker, St. Louis County, Mo.

[73] Assignee: McDonnell Douglas Corporation, St. Louis, Mo.

[22] Filed: May 18, 1970

[21] Appl. No.: 38,383

[52] U.S. Cl. ....250/203 R, 178/DIG. 21, 313/65 AB, 317/235 N
[51] Int. Cl. .................................................G01j 1/20
[58] Field of Search..........178/DIG. 21; 250/203 R, 203 CT, 250/211 J; 313/65 AB; 317/235 N

[56] References Cited

UNITED STATES PATENTS

| | | |
|---|---|---|
| 3,293,440 | 12/1966 | Mueller......................250/211 |
| 3,351,493 | 11/1967 | Weiman et al.........250/203 X |
| 2,892,949 | 6/1959 | Hardy....................250/203 X |
| 3,289,024 | 11/1966 | De Haan et al..............313/65 |
| 3,369,124 | 2/1968 | Dueker.....................250/211 |

Primary Examiner—William F. Lindquist
Attorney—Charles B. Haverstock

[57] ABSTRACT

Detector means for use in imaging tubes such as a vidicon imaging tubes, said detector means being constructed as a layered element including a layer of semi-conductor material having a transparent or semi-transparent conducting barrier forming layer in intimate contact with one of the surfaces thereof, a plurality of spaced ohmic contacts on the opposite surface of the semi-conductor layer from the barrier layer, respective output connections to said spaced contacts in which signal responses are produced when incident light impinges on the barrier forming layer, a peripheral connection extending around the conducting layer and in contact with the conducting and semi-conductor layers, and a load circuit connected to said peripheral connection in which video output signals generated in the peripheral connection are produced. The subject detector means are particularly suitable for use with image forming optical systems or devices and with other means which scan the surface of the semi-conductor layer opposite from the surface on which incident light impinges to produce a video output for some purpose.

5 Claims, 2 Drawing Figures

PATENTED SEP 19 1972　　　　　　　　　　　　　　3,693,013

INVENTOR
JAMES E. DUEKER
BY Charles B. Haverstock
ATTORNEY

VIDEO TRACKING, LATERAL PHOTOEFFECT SEEKING ELECTRO-OPTIC DETECTOR

Imaging tubes including vidicon camera tubes have been in use for a long time and are used for many purposes including for producing video output signals representing an image field of view for transmission and/or for other purposes. However, as far as known, no one heretofore has devised or developed a camera such as a television camera having a vidicon or vidicon-like tube which camera can be manually directed at a particular object or target in a field of view being observed, be it a stationary or a movable object or target, and thereafter the camera can be switched to a mode of operation in which signals and particularly signals produced by light emitted or reflected by a particular object in the observed field of view can be used to automatically maintain the camera centered and locked onto the said object or target without requiring any further attention by an operator. This is possible with the present detector means which include lateral photoelectric detector or sensing means which may be constructed as an integral part of a vidicon or like tube, which means include spaced lateral electrodes small enough in size so as to not undesirably interfere with the normal operations of the tube. Output signals are produced on each of the spaced electrodes which signals will vary inversely with the distance on the detector measured from where the selected object or target impinges in the observed field of view relative to the positions of the respective electrodes. The selected object can then be maintained in a central position in the field of view as observed by the subject detector by maintaining the signals produced at all of the spaced electrodes equal. The present detector therefore allows an operator to search a field of view, determine the location or locations of one or more points of interest which are characterized by having distinguishable light emitting or reflecting characteristics, assign priorities to one or more particular points of interest, proceed to locate a selected one of the points of interest at the center of the field of view as it impinges on the tubes, and then by switching from manual to automatic operation cause the device on which the subject detector means are installed to thereafter automatically maintain itself aimed at the particular selected priority point. This is possible because of the lateral photoelectrical effect that is obtained by the present detector. The present detector can be incorporated as part of a conventional vidicon or like tube, it can be used with other types of aiming and sighting devices and it can be made as a separate unit by itself.

It is a principal object of the present invention to provide means by which devices such as television cameras and the like which employ vidicon tubes as well as other aiming, tracking and sighting devices can be directed to locate particular objects or targets in a field of view and to lock on and follow or track such an object or target automatically.

Another object is to provide electro-optical detection means capable of responding to selected and detectable emitted or reflected visible, invisible, and coherent or laser light.

Another object is to incorporate light sensitive detector means in vidicon and the like devices with little or no adverse effect on the normal tube operations.

Another object is to provide a semi-conductor light sensitive means capable of producing a lateral photoelectric effect.

Another object is to provide means by which electro-optical aiming, sighting and tracking devices such as television imaging or camera tubes can be operated passively requiring an operator as well as automatically or semi-automatically in which case it locks on and will follow or track a particular object or target being viewed.

Another object is to simplify the work load required by a television camera man and improve the accuracy of operation of television cameras and like devices.

Another object is to provide improved means for generating signals which can be used for controlling the operations of aiming and sighting devices.

Another object is to provide relatively inexpensive means for increasing the operating versatility of aiming, tracking and sighting devices.

Another object is to provide a relatively simple and inexpensive means for improving the operating and performance capabilities of vidicon tubes and like devices, which means can be incorporated for use in conventional types of television vidicon tubes and other like devices.

Figure 2:
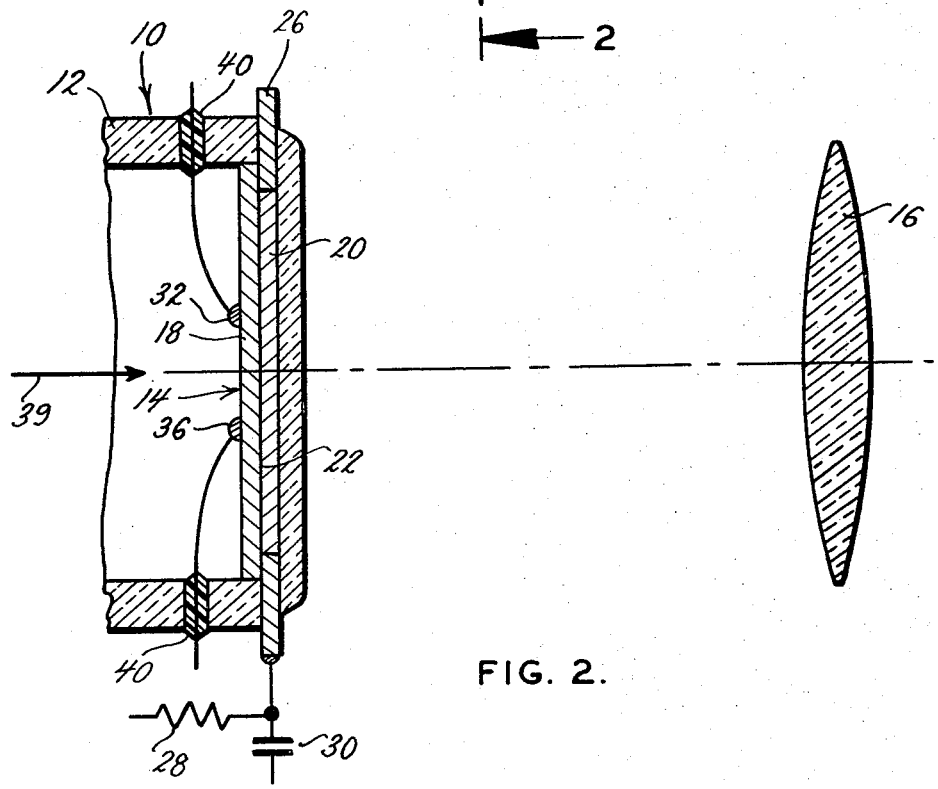

These and other objects and advantages of the present invention will become apparent after considering the following detailed specification which discloses a preferred embodiment thereof in conjunction with the accompanying drawing, wherein:

FIG. 1 is a cross-sectional view taken through a portion of a vidicon tube or other optical aiming, sighting, tracking or viewing device showing a preferred embodiment of the subject detector means installed thereon; and, FIG. 2 is a cross-sectional view taken on line 2—2 of FIG. 1 and showing the vidicon tube and associated detector being used in conjunction with a lens.

Referring to the drawing more particularly by reference numbers, number 10 refers to a vidicon tube including a glass envelope 12 having on its forward end light sensitive means including an electro-optic detector 14 constructed according to the present invention. The detector 14 is positioned in the tube 10 to have one of its opposite surfaces exposed to incident light coming from a field of view which field may include one or more objects or targets of special interest which are distinguishable by their light emitting or reflecting characteristics. The incident light may pass through image forming optical means shown as lens 16 which desirably focuses or concentrates the incident light onto the surface of the detector 14. Precise focusing may be necessary for producing a satisfactory video output but it is not necessary that the image light be in precise focus for the subject detector to operate. The subject device can also be made to respond to many different kinds of frequencies and wavelengths of light. The modulating frequency of the incident light from a particular object or target to be tracked in the field of view may, however, have an important effect on the size and other physical characteristics of the detector as will be explained.

The detector 14 is constructed of a layer or body of a semi-conductor material 18 which has a transparent or semi-transparent conducting signal plate or layer 20 formed on the surface thereof that is exposed to the incoming incident light. The layer 20 is formed on the semi-conductor body 18 by some process such as by electro-deposition in a vacuum or other similar process in which a junction or barrier 22 is formed between the layers 18 and 20. The detector 14 also includes an annular conducting layer or output signal lead 26 which extends around the periphery of the conducting signal plate 20 and is in electrical contact with the semi-conductor layer 18 and with the plate 20. When the tube 10 is operating the output video signals are present on the annular lead 26, which lead is connected to an output circuit shown as including a load resistor 28 and a load capacitor 30. The output signals present in the output circuit are fed to suitable detector, amplifier and other types of circuits where they are detected, amplified, modulated, shaped and so forth for some purpose such as the transmitting of a video signal or the like.

The detector 14 has four ohmic contacts 32–38 positioned in two sets of spaced opposed pairs on the opposite surface of the semi-conductor layer 18 from the barrier forming layer 20. The locations, including the spacing of the contacts 32–38 are important to the operation of the device and to some extent are controlled by the modulating frequency of the particular light to which the device is made to respond. When light of a particular modulating frequency impinges on the detector 14 in a spot it will cause output signals to be produced at the several contacts 32–38 that will vary in an inverse relationship to the distance from the effective center of the light spot to the said contacts 32–38. These signals can then be used to locate the image in the field of view and/or to keep the particular image centered in the field of view by moving the tube 10. In this way the subject detector can be used to make the tube 10 or other device on which it is used follow or track an image. It can also be used on a moving object such as a vehicle to keep an object such as a star or other target in view and as such it has applications on many devices.

The spacing between the opposed pairs of contacts 32 and 36 and 34 and 38 as already stated is important to the invention and is determined by the frequency or pulse duration or wavelength of the selected incident light to be observed in the field of view. In general, the shorter the pulse duration or the higher the frequency the closer the spacing between the pairs of opposed contacts 32–38. Also, to assure a relaxation time greater than about 1/30 of a second which is usually required, the resistivity of the semi-conductor material in the layer 18, which may be a silicon material, should be of an order of about $10^{+12}$ ohm-centimeters. Furthermore, the present device can be made to respond to emitted as well as reflected visible and invisible light including coherent or laser light which further expands its possible uses and enables it to be used for many different purposes.

When the subject improvements are installed on a vidicon tube, such as the tube 10, some means such as scanning electron beam 39 which is controlled to sweep the surface of the semi-conductor layer 18, are employed to produce the desired video outputs on the lead 26. However, since the beam 39 will usually scan most of the detector surface it is important that the contacts 32–38 be as small as possible to minimize distortion. The same is true of the leads which connect the contacts to associated circuits, which leads extend through insulation means 40 located in holes provided therefor in the glass tube envelope 12. The insulation 40 must be such that it fills and seals the holes so that the inside of the tube is maintained in a proper vacuum sealed condition.

The subject device can be operated in a semi-active configuration employing laser illuminators which are directed at a remote object to be tracked. Typical of such laser illuminators are illuminators of the He-Ne, YAG-Nd or GaAs types. The device can also operate with any other suitable illumination source whose optical emission or reflection characteristics correspond in some degree with the spectral absorption characteristics of the semi-conductor and/or silicon layers employed in the detector. The device can also be used in a passive tracking mode in which case the device observes reflected or emitted light from a field of view and is switched to a semi-active mode when it is to be used for automatic seeking or following. Furthermore, the accuracy with which the subject device will track depends to a large extent on the spacing between the ohmic contacts 32–38, and this in turn bears a relationship to the frequency or pulse duration of the light from the particular object or target being tracked, the higher the frequency of the particular incident light the closer should be the spacing of the contacts 32–38, as aforesaid. The focusing precision may also have an effect on accuracy.

When the subject device is in operation, the incident light from the observed field of view passes through image forming optical means such as the lens 16 and is focused thereby onto the transparent conducting surface 20 of the subject detector device 14. At the same time the opposite surface of the semi-conductor layer 18 is scanned by the electron beam 39 generated in the tube in the usual way to produce output video signals on the peripheral output signal lead 26, which outputs are fed to the output circuit formed by the elements 28 and 30 as explained above. Only that light which is from the object being tracked, which is distinguishable by its frequency, will produce the responses or outputs at the connections 32–38, and these will depend on where the particular object is located in the field of view. Such an object can be a movable member with a light source mounted on it, it can be a member emitting or reflecting a particular kind of frequency modulated light, it can be a star or a like object or it can be identifiable optically in some other recognizeable and detectable way. The light from such an object will produce responses in the ohmic contacts as stated, and the contact or contacts nearer or nearest to where the image from said object impinges on the detector will ordinarily produce the largest output assuming that the circuits associated with all of the contacts are electrically balanced. The signals produced at all four of the contacts 32–38 can then be used to drive means of some well known construction, such as servo means, to move the tube 10 in such a manner as to maintain the particular object or target centered in the field of view. In this way the subject detector means can follow an object or target regardless of whether the object or target is in precise focus and even in cases where several objects are present and priorities are assigned. This is true just so long as the image from the object in question is not so large and imprecise that it impinges on the detector and covers or substantially covers the area of the signal plate 20 occupied by the contacts 32–38.

When a television camera man using a camera equipped with detector means such as disclosed herein is observing a particular object in a field of view that includes an object that emits light modulated at a particular detectable frequency, he sights on the object through the usual eyepiece and can if he wants to follow the object manually by moving the camera. If the camera is equipped with the subject detector means, however, he has the option where the object is distinguishable by its light emitting or reflecting characteristics, to switch from manual to automatic operation after which the camera will automatically move as the object in the field of view moves relative to the camera to maintain the selected object in the center of the observed field of view. Thereafter, the camera will automatically follow the selected object without any further effort being required by the operator, regardless of whether the object or camera is stationary or moving, and regardless of whether the camera is sharply focused on the object. The television application described herein is only one of many possible applications where it may be desired to follow or track a distinguishable object for some reason. Other applications might include tracking an animal with an attached light source as it moves in the wilds or in a maze for some reason, tracking an air or space vehicle or some other missile or moving object, locking on a star, and for many other purposes. The subject detector means can also be used on or in association with many other types of sighting and tracking devices used to observe fields of view in which there is one or more objects which are distinguishable by their light emitting or reflecting characteristics, including devices such as weapon sights and so forth, and it is not intended to limit use of the subject detector means to any particular application since many are possible and within the scope of the invention.

Thus there has been shown and described novel electro-optical detector means which fulfills all of the objects and advantages sought therefor. It is apparent, however, that many changes, modifications, alterations, and other uses and applications of the subject detector means will become apparent to those skilled in the art after considering this specification and the accompanying drawing. All such changes, modifications, alterations and other uses and applications which do not depart from the spirit and scope of the invention are deemed to be covered by the invention which is limited only by the claims which follow.

What is claimed is:

1. In a vidicon tube having a light sensitive surface formed by a semi-conductive layer of material characterized by having a relatively high resistivity characteristic and having two opposed surfaces one of which is positioned on the tube to be exposed to incident light from an observed field of view, said vidicon tube having other means for scanning the light sensitive surface with an electron beam to produce a video output signal which represents the observed field of view, the improvement comprising means for responding to light from a particular location in the field of view which light is distinguishable from other light in the field of view by having particular distinguishable characteristics such as a distinct frequency, spectral content, or frequency modulation, said light responsive means comprising a layer of electrically conductive and optically conductive material formed on one of the opposite surfaces of the light sensitive semiconductor layer to form a barrier layer therebetween, said barrier forming layer being exposed to incident light observed from the field of view, and a plurality of ohmic contacts located in spaced relationship to each other on the opposite surface of the semi-conductor layer from said barrier forming layer, said ohmic contacts having a size that is extremely small in relation to the size of the said opposite surface of the semi-conductive layer, electric signals being produced at said ohmic contacts which vary in magnitude directly with the intensity of the distinguishable light impinging on the light responsive means from the particular location in the observed field of view and inversely with the distance between where the said distinguishable light impinges on the barrier forming layer relative to each of said respective ohmic contacts, and circuit means connected to each of said ohmic contacts.

2. Image seeking means for use on imaging devices capable of producing video output signals to represent an observed field of view which has one or more objects in it that are distinguishable optically by the characteristics of the light they give off such as by its frequency, spectral content characteristics or by being modulated, said image seeking means including semiconductor detector means on the imaging device in positions to be exposed to light received from the observed field of view including the light from said objects, said detector means including a body of semiconductor material characterized by having relatively high resistivity characteristics and having opposite surfaces, means forming a relatively transparent barrier layer on one of said opposite surfaces in position to be exposed to the light from the observed field of view, means forming a plurality of spaced ohmic contacts on the opposite surface of the semi-conductor body from the barrier forming layer, output means including a lead connected respectively to each of said ohmic contacts, signals being produced in the said output leads which vary in direct proportion to the intensity of the light from said objects impinging on the detector means and inversely with the distance between the location on the detector means where the light from said objects impinge and the respective ohmic contacts, said imaging device having a transparent envelope including side and end walls, and an electron gun for scanning the semi-conductor body on the opposite surface thereof from the barrier forming layer, said imaging device having a video output connection extending around and in electrical contact with the periphery of the semiconductor body, said detector means being formed on and supported by the envelope end walls.

3. The image seeking means defined in claim 2 including means in said imaging device envelope for sealably supporting the output leads connected to the respective ohmic contacts.

4. The image seeking means defined in claim 2 wherein said plurality of spaced ohmic contacts include four ohmic contacts positioned in two opposed pairs across a central region of the said opposite surface of the semi-conductor body.

5. The image seeking means defined in claim 2 including optical means for focusing the image of the observed field of view onto said detector means.

* * * * *